INVENTORS
ROBERT E. O'BRIEN
LANE T. WELLS
BY
ATTORNEYS

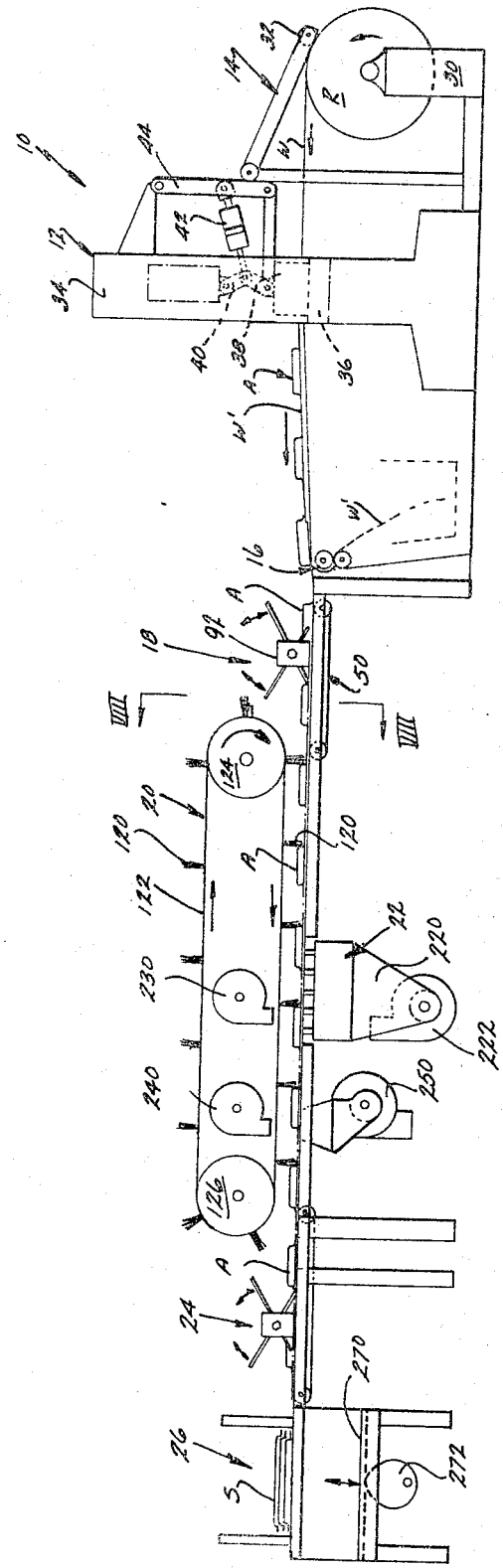

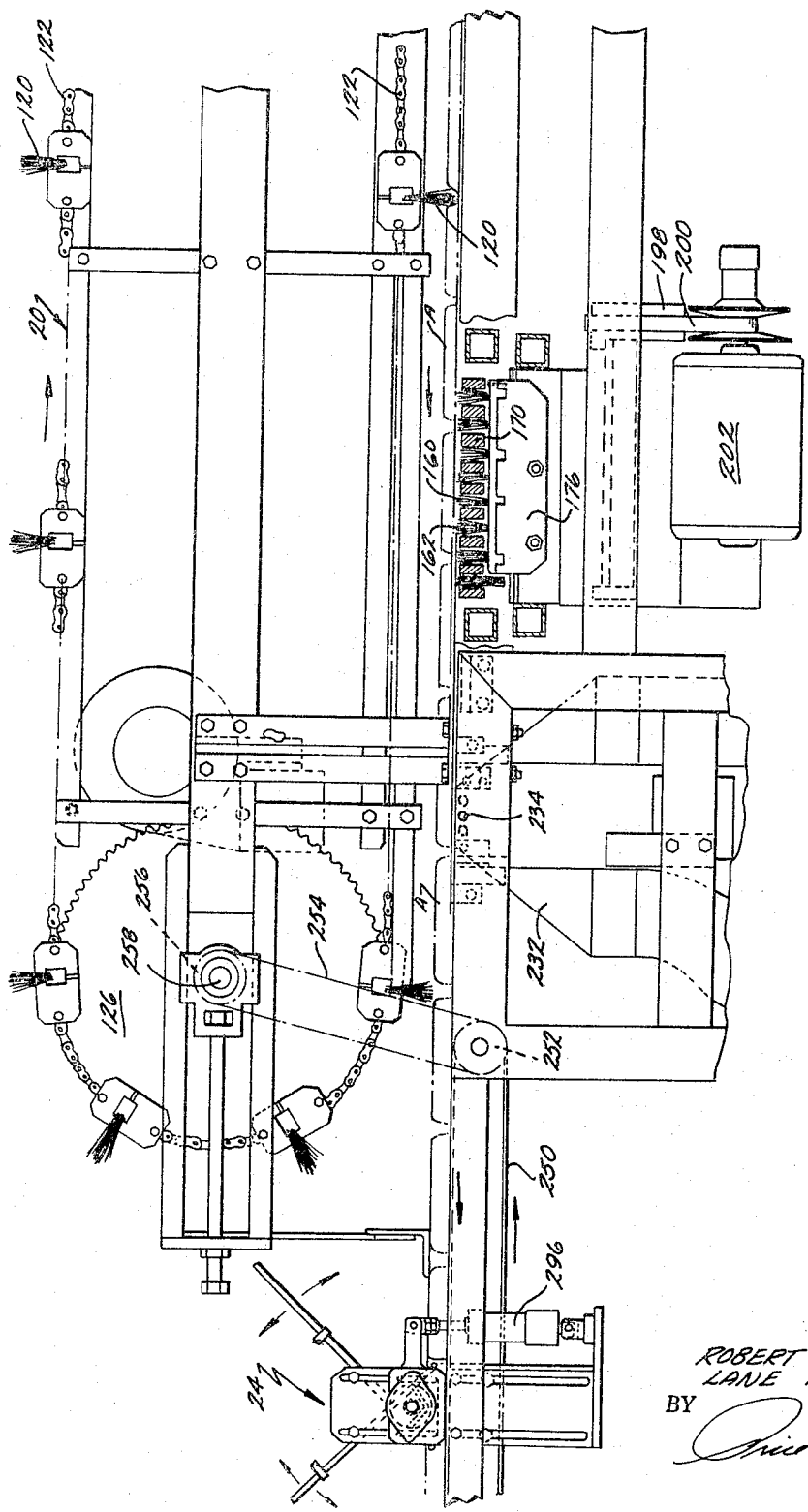

June 27, 1967  R. E. O'BRIEN ET AL  3,327,344
PLASTIC ARTICLE FORMING AND HANDLING SYSTEM
Filed Jan. 28, 1966  6 Sheets-Sheet 5

INVENTORS
ROBERT E. O'BRIEN
LANE T. WELLS
BY
ATTORNEYS

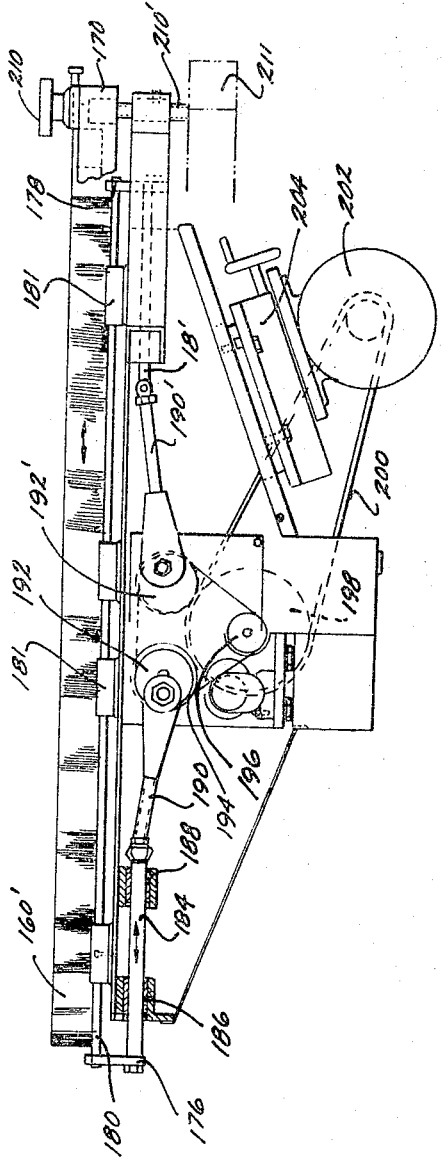
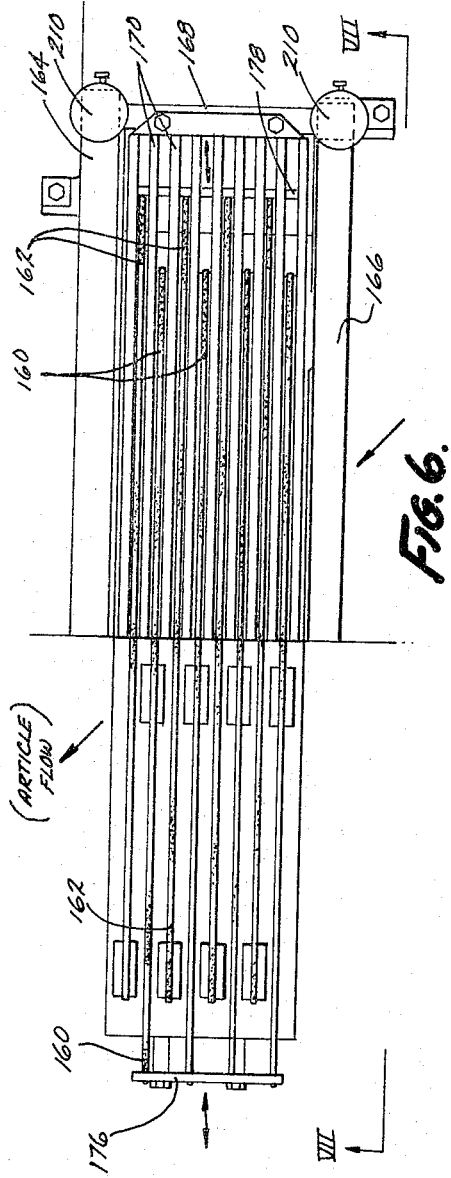

United States Patent Office 3,327,344
Patented June 27, 1967

3,327,344
PLASTIC ARTICLE FORMING AND HANDLING SYSTEM
Robert E. O'Brien, Grand Rapids, and Lane T. Wells, Grand Haven, Mich., assignors to Kirkhof Manufacturing Corporation, Grand Rapids, Mich., a corporation of Michigan
Filed Jan. 28, 1966, Ser. No. 523,737
10 Claims. (Cl. 18—4)

This invention relates to a system and apparatus for forming three dimensional plastic articles from a two dimensional continuous plastic web, and advancing the articles on a regulated basis from a pressure differential forming mechanism, past deslivering means and to a stacker.

Forming three dimensional container type articles from a generally continuous plastic web normally necessitates considerable manual labor by workmen standing beside the forming press, picking up the individual articles, and stacking them. In order for plastic trays or like containers to be competitive with non-plastic containers, production output must be high, and should involve a minimum of manual labor. Treatment of the individual trays should also be minimized after forming. However, it has been found that plastic articles formed by creasing the periphery of the articles in the forming press, and subsequently breaking the articles out of the web have tiny slivers around the periphery which need to be removed, thereby creating an additional expense because of the necessity of a deslivering process. Moreover, it has been found that deslivering of thin, flexible tray-type article containers involves special and particular operations in order to prevent the containers from crushing and to effectively desliver all of the peripheral edge of the polygonal containers. Presently commercial manufacture of three dimensional plastic-type articles such as tray containers, from a continuous web, involves several distinct forming, treating and stacking operations, each with a different rate of feed advance and all presently requiring manual labor for feeding in articles and removing them.

It is an object of this invention to provide a system of apparatus for automatic forming, handling, deslivering and stacking of plastic tray-type articles from a generally continuous web, in a continuous high production fashion with a minimum of manual labor. The apparatus uniquely controls tray advancement from a forming press, through a slippage tray feed regulator and spacer, through a desliver unit under the effect of positive feed apparatus, and through a second slippage regulator and spacer to a tray stacker. The apparatus effects exact control of article movement, yet without manual labor. The apparatus employs slippage between individual trays and tray advancing means on both the upstream and downstream ends of the desliver unit, to regulate tray advancement in accordance with output of the slowest component of the system, and yet achieves a positive non-slipping feed between the individual trays and the desliver unit in the center of the system.

Another object of this invention is to provide a unique deslivering apparatus for plastic tray-type articles to efficiently and effectively remove tiny plastic slivers from the polygonal peripheral edge of the trays. The apparatus uniquely deslivers the edges of the polygonal, flexible, thin walled containers at a high rate, without crushing or otherwise damaging the articles. It has a special arrangement and orientation with respect to the article feed means to assure deslivering of all edges of the polygonal container periphery with just one pass of the articles past the equipment.

These and other objects of this invention will become apparent upon studying the following specification in conjunction with the drawings in which:

FIG. 1 is a schematic side elevational view of the elongated system showing the interrelationship of the operative components;

FIG. 2b is an enlarged fragmentary side elevational view of a portion of the apparatus in FIG. 1, cooperative with the apparatus in FIG. 2a such that, FIGS. 2a and 2b can be placed end to end to show the complete deslivering and positive feed apparatus;

FIG. 6 is a plan view of the deslivering brush subassembly;

FIG. 7 is an elevational view of the subassembly in FIG. 6, taken on plane VII—VII;

Figure 2A:
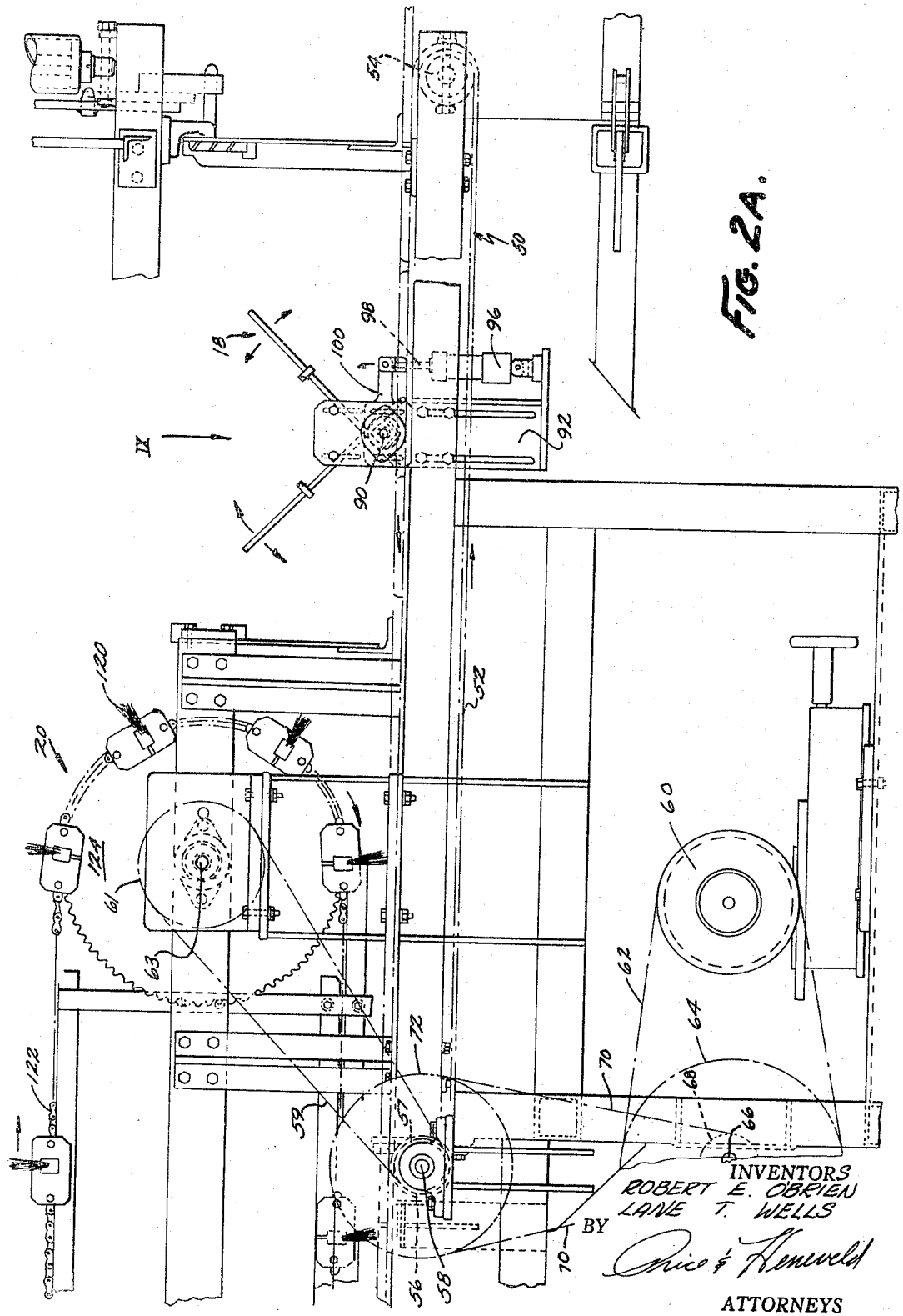
FIG. 2A is an enlarged fragmentary elevational view of a portion of the apparatus in FIG. 1.

Referring now specifically to the drawings, the complete system 10 illustrated in FIG. 1 includes forming press assembly 12, plastic sheet unwind and infeed mechanism 14 to the press tray breakout and web separating assembly 16, the first tray regulating advancing assembly 18, positive tray advancing assembly 20 for the desliver unit, desliver assembly 22, the second slippage type tray regulatory advancing assembly 24 to the stacker, and stacker assembly 26.

Forming press assembly 12 and tray breakout assembly 16 may be like those described and shown in detail in U.S. Patent No. 3,166,790. Sheet advancing assembly 14 to the press may be like that shown in detail in patent application Ser. No. 474,034 filed July 22, 1965 entitled Plastic Sheet Advancing Apparatus and assigned to the assignee herein. Tray stacking assembly 26 may be like that shown and described in U.S. patent application entitled Stacking Device filed Jan. 13, 1965, Ser. No. 425,195 and assigned to the assignee herein.

Briefly, the continuous web W of plastic is fed from a rotational reel R into the press assembly 12 where articles are formed into the web by pressure differential techniques, the articles A being discharged with the web, and broken out of the web at 16. The articles pass through regulatory means 18 at a predetermined spacing and timing to be picked up by the positive feed mechanism 20 and moved past the desliver apparatus 22, and then through a second regulator means 24 which spaces the articles and times their advance into stacker 26.

With the use of slippage type regulatory advancing means 18 and 24 the entire system formed of the several assemblies, each operating with a different action, is uniquely correlated.

The reel R of plastic web can be rotationally supported on suitable bearing mounts 30. The webbing W is unwound from the reel R by frictional contact of a positively driven friction roller 32 engaging the outer peripheral turn of the webbing to advance it to press assembly 12.

The press assembly 12 includes a suitable framework 34 supporting a lower platen 36 and a shiftable upper platen 38 for forming segments of the web between forming dies, preferably using auxiliary pressure differential techniques. As described and explained in issued Patent Nos. 3,166,790 and 3,190,946, upper platen 38 may be vertically reciprocated with a toggle linkage 40 utilizing double air cylinder means 42 extending between equalizer linkage 44 and toggle linkage 40. Just subsequent to formation of the articles, the periphery of the article is creased through a substantial portion of the thickness of the web so that the article can be broken out of the web when cooled as explained in U.S. Patent No. 3,190,946.

Since the articles are not completely severed from the web in the press, as a pair of friction rolls 16 pulls the modified web W' from the press, the newly formed articles A are discharged from the press with it. When the modified web W' turns the sharp angle at rolls 16, the generally stiffer articles break out of the web along the crease lines since they tend to follow a generally straight line path while the webbing changes its angular orientation. Normally a plurality of articles, e.g., three, are formed side by side with each stroke of the press to form a row. The individual rows of articles A, upside down, pass on to advancing conveyor 50 (FIGS. 1 and 2a) of regulator means 18.

Figure 3:
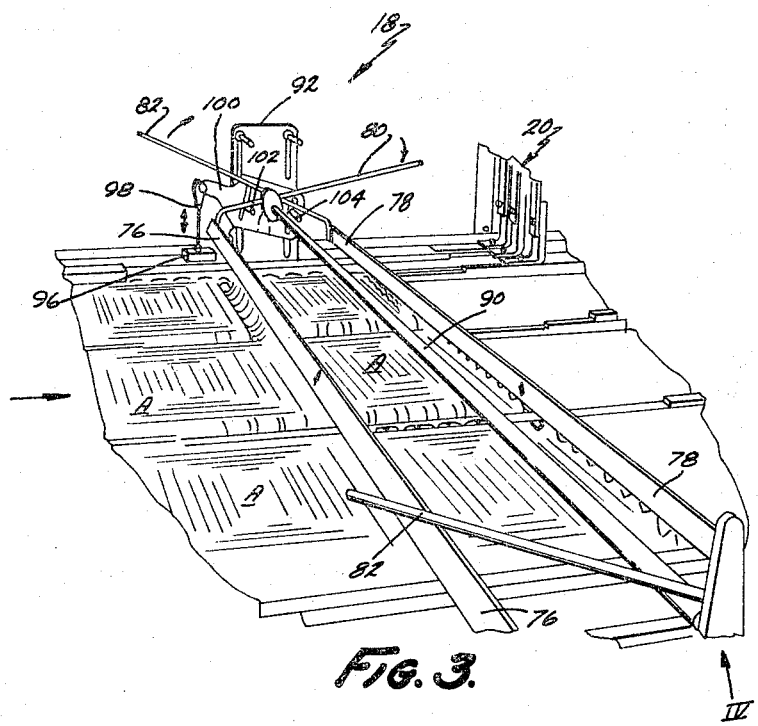
FIG. 3 is a fragmentary perspective view of the first tray advancement slippage feed type regulator means upstream of the desliver unit and downstream of the forming press, and viewed from the opposite side of the system as in FIGS. 1 and 2.
Figure 9:
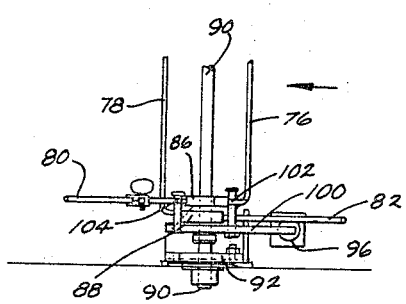
FIG. 9 is a plan view of the tray advancing regulating means in FIG. 2a, taken in the direction indicated by the arrow IX.

This conveyor 50 includes a wide continuous recirculatory belt 52 traveling around pulley rollers 54 and 56. Roller 54 is mounted on an idler shaft, while roller 56 is mounted on shaft 58 driven by motor 60 through belt 62, pulley 64, shaft 66, pulley 68, belt 70, and pulley 72. Belt 52 advances the articles A by friction in conventional conveyor belt fashion. The individual articles in each row are kept aligned by spaced guides 19, 21, 23 and 25 (FIG. 4) leading up to means 18. Control means 18 includes a pair of article gates 76 and 78 (FIG. 3) each extending transversely across conveyor belt 52. These gates are spaced apart along the length of the conveyor an amount equal to the length of the articles A. The gates can be raised and lowered alternately to pass one row of articles at a time to positive advancing means 20. The ends of gates 76 and 78 adjacent the conveyor belt edges include pairs of support rods 80 and 82 respectively, so that each gate unit is [-shaped. Each of these rods includes collars on both ends, i.e., collars 86 for rods 80 (FIG. 9) and collars 88 for rods 82. Collars 86 are rotationally mounted on the centrally positioned transverse pivot shaft 90 supported between a pair of upright brackets 92 (FIG. 3) and 94 (FIG. 4) on opposite sides of the conveyor belt 52. Collars 88 are fixed to shaft 90 to cause the shaft to pivot therewith. The gates are raised and lowered by camming pins 80 and 82 (FIGS. 2a and 3 and 9). More specifically, the extended rod 98 of air cylinder 96 is pivotally mounted to a bracket 100 which in turn is pivotally mounted to shaft 90, and includes a pair of transversely projecting camming pins 102 and 104 on opposite sides of shaft 90, and cooperatively engageable with rods 82 and 80 respectively. These pins alternatively lift and lower to pivot the rods about shaft 90, to raise and lower the respective gates 76 and 78 alternately. Thus, reviewing FIGS. 2a, 3 and 10 when piston rod 98 of air cylinder is extended, it rotates crank 100 about shaft 90, hoisting pin 102 against rod 80 to lift gate 76 for temporary passage of one row of articles A into abutment with the second gate 78. Then, with lowering of piston rod 98 and thus of crank 100, gate 76 is lowered to engage the succeeding rows of articles while gate 78 is hoisted to allow the selected advanced row to proceed to the positive advancing assembly 20.

The timing of the gates 76 and 78 of means 18 is synchronized with positive feed assembly 20 to cause release of each row of articles from gate 78 in time to pass between two adjacent brushes 120 of feed assembly 20. More specifically, a microswitch 117 includes a feeler 119 actuated with each passing brush 120 (FIG. 4) of means 20, to electrically activate (through conduit 118) a valve control 116 to cylinder 96 to retract its rod 98 downwardly to lift gate 78 and release a row of articles to the pushing brushes 120, while lowering gate 76 to stop the following rows. With lowering of gate 78, shaft 90 rotates too. Upon gate 78 being completely raised, finger 110 (FIG. 4) the end of shaft 90 actuates limit switch 114 to signal valve control 116 through conduit 121, to reverse cylinder 96 to raising gate 76 and lowering gate 78.

During operation of regulatory assembly 18, underlying conveyor belt 52 continuously moves at a constant rate. When the articles are stopped by the gates, the belt slips thereunder temporarily until they can advance again. The advancement of each row is specifically timed so that each row of articles is picked up by one positive feeding pushing type transverse brush 120 on assembly 20.

Figure 4:
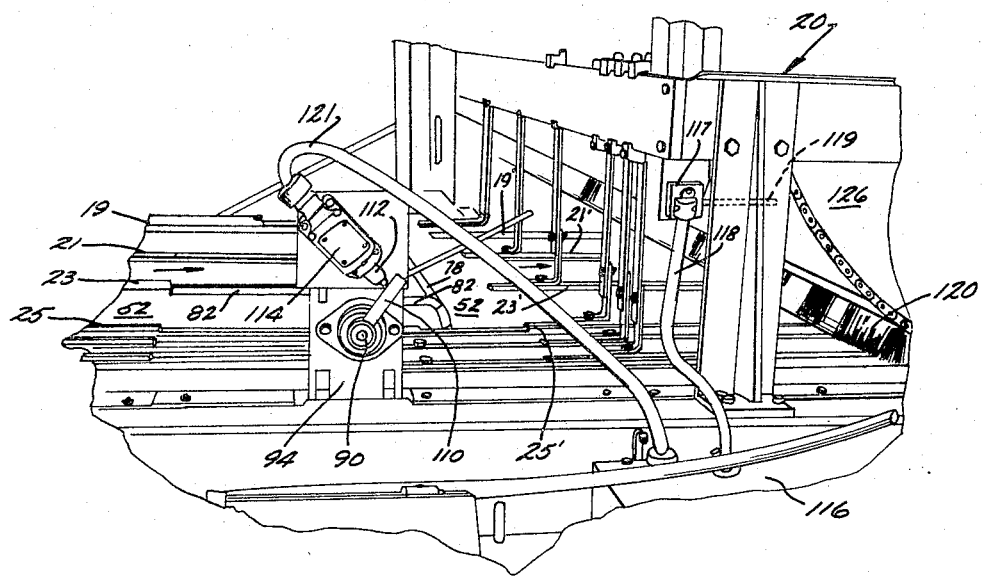
FIG. 4 is a fragmentary perspective view of the apparatus in FIG. 3, shown in the direction indicated by the arrow IV.
Figure 5:
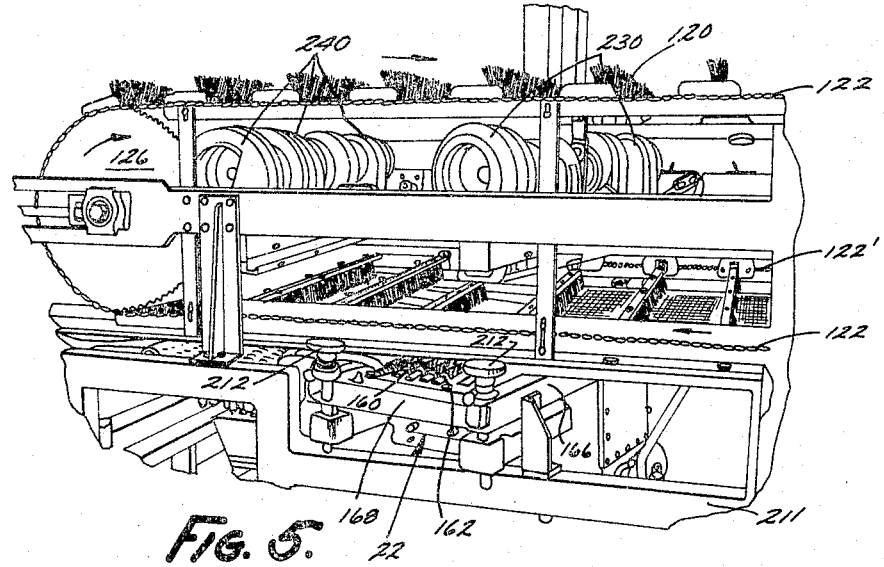
FIG. 5 is a fragmentary side perspective view of a portion of the deslivering apparatus.
Figure 8:
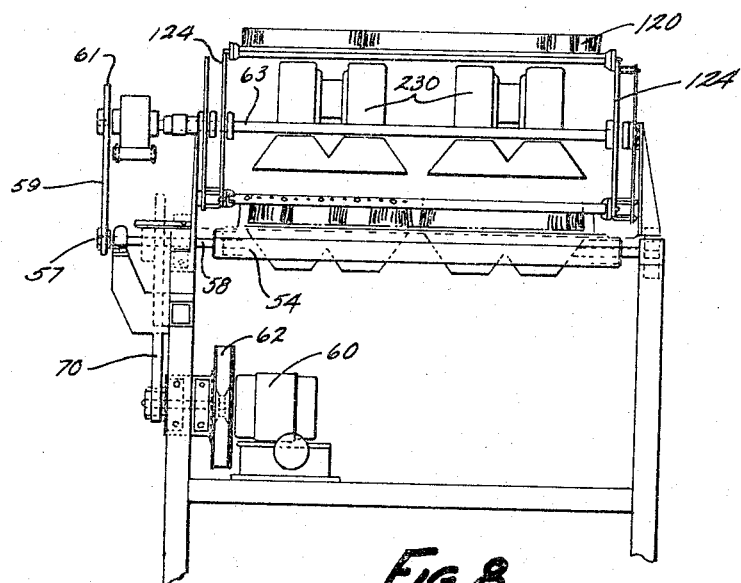
FIG. 8 is an end elevational view of the deslivering apparatus taken on plane VIII—VIII in FIG. 1.

These brushes, each extending the width of the assembly, are mounted at spaced intervals on a pair of continuously recirculating roller chains 122 and 122' which pass around respective sprockets 124 and 126 (FIG. 5). Sprockets 124 on shaft 125 are driven from shaft 58 (FIG. 2A) by pulley 57, belt 59, and pulley 61 for shaft 63. Each transverse brush 120 pushes positively one transverse row of articles A off conveyor belt 52 and past desilvering assembly 22. As the articles leave means 18, they are guided by spaced guide means 19', 21', 23' and 25' (FIG. 4). Because of the nature of desilvering apparatus 22, the feed mechanism 120 must be positive and continuous. Further, it has been found that brushes 120 serve excellently as the pushing members of this positive feed advancing means, without causing damage to the thin walled, relatively fragile, crushable trays. These brushes 120 push the inverted articles A one by one past desilvering assembly 22.

Assembly 22 is oriented generally transversely of the article path, but at a somewhat diagonal orientation. This desliver assembly 22 includes a plurality of spaced, adjacent, elongated transversely extending abrading brushes. These are in two groups, i.e., brushes 160 and brushes 162. These brushes are alternately arranged as shown in FIG. 6, so that brushes 162 can be reciprocated oppositely to brushes 160. The brushes and their mechanism are supported by a skeletal framework including a pair of spaced side supports 164 and 166 connected by end pieces 168, which have mounted therebetween a plurality of rigid parallel spaced rails 170 between which the individual brushes are positioned for transverse reciprocating movement. The uper edges of these rails cooperatively form a support surface for individual trays advanced with their peripheral edges downwardly over the transverse abrading brushes by the conveying brushes 120. Brushes 160 are all connected on one end to a transverse support 176, and brushes 162 are all connected on their opposite end to a transverse support 178 on the opposite side of the assembly. These two groups of brushes are reciprocated oppositely by the mechanism shown in FIG. 7.

More specifically, each brush e.g., brush 160' has a glide bar 180 along its underside, with these glide bars being the component mounted to support 176, and slidable in bearings 181. Connected to this support is a rod 184 which is reciprocably slidable in bearings 186 and 188, and has connected to its opposite end by pivotal joint a tie rod 190. This tie rod is mounted eccentrically on a crank 192 which is rotated on its central axis by a belt 194 driven from pulley 196. The pulley 196 is driven by a coaxial pulley 198 driven by belt 200 from motor 202. Belt 194 also drives a like crank 192', which reciprocates a connecting rod 190', which reciprocates a glide rod 184' connected to support 178 for brushes 162. Thus, motor 202 mounted on support 204 simultaneously reciprocates brushes 160 and 162 oppositely and transversely of the assembly. The specific height of the brushes with respect to the grid formed by rails 170 can be adjusted by simply turning adjusting knobs 210 on one end, and 212 (FIG. 5) on the opposite end. These knobs are connected to threaded studs e.g. 210' (FIG. 7), which support the grid and are threadably engaged with the framework 213 that supports bearings 181 brushes, and having their lower ends resting on framework 211. The deslivering brushes 160 and 162 are moved rapidly in their reciprocable pattern to brush the minute slivers from the edges of the articles which are passed over the deslivering mechanism.

It has been found that if the brushes move at an acute angle to the direction of travel of the trays, rather than directly transversely, the deslivering effectiveness is far greater, with all of the peripheral edges on the polygonal shaped articles then being completely deslivered, yet without crushing the walls of the articles. When the brushes are directly normal to the line of tray motion, the thin walls of the tray articles tend to be buckled when light gauge plastic is involved. Some of the loosened slivers then fall off so that preferably assembly 22 includes immediately therebeneath a receiving chamber 220 connected to the inlet of a suction blower 222. Immediately above the brushes of assembly 22 is a plurality of transversely spaced blowers 230 which create an air current down across the trays. Many of the loosened slivers still cling to the articles due to electrostatic attraction. Immediately downstream of the brush apparatus is electrostatic sliver die charging and removal apparatus.

This static electricity system includes a receiving chamber 232 with a plurality of electrically charged, transversely positioned elongated rods 234 adjacent the articles to provide electrostatic discharge to the slivers to neutralize their charge. With this charge neutralized, the slivers can be readily moved out of the trays by air currents. These air currents may be created by blowers 240 positioned adjacent the trays, and by suction means 250 having inlet means communicant with chamber 232.

The elongated positive feed brushes 120 advance the deslivered articles A to the second regulatory feed advancing means 24. This includes a pair of gates like those described with respect to assembly 18, and shown in FIGS. 2A, 3 and 9. That is, it includes a pair of alternatively raised and lowered control gates mounted on rods operated by air cylinder 296 in the same manner as cylinder 96 operates assembly 18. Articles are advanced through this regulatory means by a second conveyor belt 250 passing around suitable rollers 252 driven as by belt 254 connected to a pulley 256 on shaft 258 coaxial with sprockets 126 for assembly 20. Control means 24 causes the deslivered articles to be stopped, with slippage of belt 250 thereunder temporarily occurring, and then allowed to proceed, one row at a time, to the vertically reciprocating platform of stacker assembly 26. This stacker, basically like that shown and described in U.S. patent application Ser. No. 425,195, filed Jan. 13, 1965, identified above, includes a platform 270 (FIG. 1), which is vertically reciprocated by cam means 272, to shove the individual articles upwardly into the bottom of stacks S, and then return to a lower position to pick up the next row of articles advanced in timed relation by the regulator means 24.

Briefly therefore, the apparatus provides a complete system for automatically forming articles from a plastic web, advancing the articles in controlled fashion through special slippage type regulatory feed means, then through a second special slippage type regulator feed means to a stacker assembly, so that the articles are ready for shipment in stacked form. A minimum of manual labor is required, i.e. only to oversee the operation, and, even though desliverying is conducted on a continuous flow basis, and forming and stacking are conducted on an intermittent flow basis, smooth regulatory cooperative action occurs between the assemblies of the system at all times.

Additional objects of the invention and certain additional advantages may readily occur to those in this art upon studying the foregoing specification and drawings. It is also conceivable that details of the construction could be modified without departing from the concept presented. Hence the invention is intended to be limited by the scope of the appended claims and the reasonably equivalent structures to those defined therein.

We claim:

1. In apparatus for forming articles from a plastic web, deslivering, and stacking the plastic articles, including plastic web supply means, reciprocable pressure differential forming press means positioned to receive plastic web from said supply means and repeatedly form spaced three dimensional articles into the web and peripherally crease the articles, means for intermittently pulling the web and formed articles from said forming means and for separating the articles from the web matrix, article desliver means downstream of said web pulling and article separating means, and reciprocable article stacking means downstream of said desliver means, the improvement comprising: first article feed regulating means downstream of said web pulling and article separating means, and upstream of said desliver means, including first constantly driven article advancing belt means positioned to receive, support, and advance articles separated from the web, and including article stopping and releasing gate means; positive, continuous driving acting article pushing means including a plurality of spaced article pushing means to receive articles in spaced regulated fashion from said first regulating means and to positively and continuously push them in a path past said article desliver means; control means operably associated with said article pushing means and said gate means to operate said gate means in synchronism with said pushing means; and second article feed regulating means downstream of said desliver means and article pushing means and including second article advancing constantly driven belt means positioned to receive articles from said pushing means, and second article stopping and releasing gate means to allow advancement of the deslivered articles in intermittent, spaced, regulated fashion to said stacking means.

2. The apparatus in claim 1 wherein said gate means each includes a pair of stop gates spaced apart in the direction of article movement the length of the articles being advanced, and alternately shiftable into and out of the path of advancing articles.

3. The apparatus in claim 1 wherein said recirculatory article pushing means includes endless recirculatory elements and a plurality of spaced article pushing brushes thereon extending transversely to the direction of article movement and movable in the direction of article movement.

4. The apparatus in claim 1 wherein said desliver means includes a plurality of elongated brushes extending generally transversely of the direction of article movement and mounted to reciprocate along their length.

5. The apparatus in claim 4 wherein said brushes include a first group of brushes operably driven to reciprocate and a second group of brushes positioned alternately between ones of said first group and operably driven to reciprocate oppositely to those of said first group.

6. The apparatus in claim 5 wherein said brushes are generally diagonally oriented across the path of article movement.

7. Desliver apparatus for removing tiny plastic slivers from the peripheral edges of plastic articles formed into and separated from a generally continuous plastic web, comprising: article pushing means movable in an advancing path; a plurality of elongated sliver loosening brushes extending generally transversely of said path, and including first and second groups of brushes, the individual brushes of the first group arranged alternately with the individual brushes of the second group; said brushes being mounted for reciprocation along their length generally transverse of said path; drive means operably connected to said first group and to said second group and arranged to reciprocate said first group oppositely to said second group.

8. The apparatus in claim 7 wherein said brushes are diagonally oriented across said path of article movement.

9. The apparatus in claim 8 including electrostatic charge means adjacent said groups of brushes to treat the loosened slivers for removal from the articles, and air flow means to remove the loosened electrostatically treated slivers.

10. The apparatus in claim 7 wherein said article pushing means includes endless recirculatory elements and a plurality of spaced article pushing brushes thereon extending transversely to the direction of article movement and movable in the direction of article movement.

References Cited
UNITED STATES PATENTS

| | | | |
|---|---|---|---|
| 2,342,443 | 2/1944 | Wood. | |
| 3,033,737 | 5/1962 | Peters | 18—19 X |
| 3,166,790 | 1/1965 | Keys | 18—19 |
| 3,244,780 | 4/1965 | Levey et al. | 18—19 X |
| 3,277,224 | 10/1966 | Whiteford | 18—19 X |

WILLIAM J. STEPHENSON *Primary Examiner.*